(12) United States Patent
Xu et al.

(10) Patent No.: US 12,271,075 B2
(45) Date of Patent: Apr. 8, 2025

(54) SPLICING PANEL

(71) Applicant: TCL CHINA STAR OPTOELECTRONICS TECHNOLOGY CO., LTD., Guangdong (CN)

(72) Inventors: Hongyuan Xu, Guangdong (CN);
Juncheng Xiao, Guangdong (CN);
Huajun Lu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 61 days.

(21) Appl. No.: 17/781,002

(22) PCT Filed: May 23, 2022

(86) PCT No.: PCT/CN2022/094399
§ 371 (c)(1),
(2) Date: May 30, 2022

(87) PCT Pub. No.: WO2023/216312
PCT Pub. Date: Nov. 16, 2023

(65) Prior Publication Data
US 2023/0375867 A1    Nov. 23, 2023

(30) Foreign Application Priority Data

May 7, 2022    (CN) .......................... 202210490724.3

(51) Int. Cl.
G02F 1/1333    (2006.01)
G02F 1/1335    (2006.01)
(Continued)

(52) U.S. Cl.
CPC .... *G02F 1/13336* (2013.01); *G02F 1/133512* (2013.01); *G02F 1/133603* (2013.01); *G02F 1/1339* (2013.01)

(58) Field of Classification Search
CPC .......... G02F 1/13336; G02F 1/133603; G02F 1/133606; G02F 1/133512
(Continued)

(56) References Cited

U.S. PATENT DOCUMENTS

2013/0027633 A1*    1/2013    Park ...................... G02B 6/0055
                                                        362/235
2021/0332967 A1*    10/2021   Yueh ..................... F21V 14/003
(Continued)

FOREIGN PATENT DOCUMENTS

CN    112767849 A    5/2021
CN    112856263 A    5/2021
(Continued)

OTHER PUBLICATIONS

International Search Report in International application No. PCT/CN2022/094399, mailed on Dec. 19, 2022.
(Continued)

*Primary Examiner* — Dung T Nguyen
*Assistant Examiner* — David Y Chung
(74) *Attorney, Agent, or Firm* — Rivka Friedman (57) ABSTRACT

The present application discloses a splicing panel. The present application is provided with a dimming layer on a light-emitting diode lamp plate, and then the dimming layer is provided with a plurality of first light shading parts arranged in an array. A visual effect of the light-emitting diode lamp plate on both sides in a first direction can be adjusted through the plurality of first light shading parts, so as to improve a visual difference between display panels (Continued)

of the splicing panel and the light-emitting diode lamp plate on both sides in the first direction.

14 Claims, 6 Drawing Sheets

(51) Int. Cl.
*G02F 1/13357* (2006.01)
*G02F 1/1339* (2006.01)

(58) Field of Classification Search
USPC .......................................................... 349/73
See application file for complete search history.

(56) References Cited

U.S. PATENT DOCUMENTS

2022/0059608 A1 2/2022 Tseng et al.
2022/0404659 A1* 12/2022 Qi ........................ G02F 1/1336

FOREIGN PATENT DOCUMENTS

| CN | 114141154 A | 3/2022 |
| CN | 114170919 A | 3/2022 |
| CN | 114203058 A | 3/2022 |

OTHER PUBLICATIONS

Written Opinion of the International Search Authority in International application No. PCT/CN2022/094399, mailed on Dec. 19, 2022.

* cited by examiner

SPLICING PANEL

BACKGROUND

Field of Invention

The present application relates to a field of display technology, in particular, to a splicing panel.

Description of Prior Art

With a rapid development of an outdoor display market, large sizes and high resolution have become a development direction of outdoor display. A demand for various super large-size display devices is increasing day by day, and the super large-size display devices are more and more widely used in various scenes. Therefore, splicing display devices, such as liquid crystal display (LCD) splicing display devices, have also attracted more and more attention. The splicing display devices can splice multiple LCD panels to form a super large-size display screen for screen display according to actual display needs, and have advantages of clear screen display and high flexibility.

Although traditional LCD panels not only have low cost, but also have high resolution; as splicing panels, they cannot eliminate splicing seams, affecting visual effects. Therefore, in order to solve a visual problem of the splicing seams, an existing LCD splicing panel is usually provided with a light-emitting diode lamp plate at the splicing seams of the LCD splicing panel. Although the light-emitting diode lamp plate can alleviate the visual problem of the splicing seams of the LCD splicing panel, there are still a visual difference between the light-emitting diode lamp plate and an LCD display panel, resulting in poor display effects of the LCD splicing panel.

SUMMARY

The present application provides a splicing panel to improve a visual difference of a splicing panel.

The present application provides a splicing panel, comprising:
- at least two display panels, wherein the at least two display panels are spliced, and a gap is defined between two adjacent ones of the display panels;
- a light-emitting diode lamp plate, wherein the light-emitting diode lamp plate is arranged between two adjacent ones of the display panels and blocks the gap;
- a dimming layer, wherein the dimming layer is arranged on the light-emitting diode lamp plate, and a plurality of first light shielding parts are arranged on the dimming layer; the plurality of first light shielding parts are arranged in an array, and a length direction of each of the first light shielding parts is arranged along a first direction.

Alternatively, in some embodiments of the present application, a plurality of second light shielding parts are arranged on the dimming layer, the plurality of second light shielding parts are arranged in an array, and a length direction of each of the second light shielding parts is arranged along a second direction.

Alternatively, in some embodiments of the present application, a first gap is defined between an orthographic projection of one of the first light shielding parts in the first direction and an orthographic projection of one of the second light shielding parts adjacent to the one of the first light shielding parts in the first direction.

Alternatively, in some embodiments of the present application, second gap is defined between an orthographic projection of one of the first light shielding parts in the second direction and an orthographic projection of one of the second light shielding parts adjacent to the one of the first light shielding parts in the second direction.

Alternatively, in some embodiments of the present application, the light-emitting diode lamp plate is a sub-millimeter light-emitting diode lamp plate or a micro-light-emitting diode lamp plate.

Alternatively, in some embodiments of the present application, the dimming layer comprises:
- a sealing layer, wherein the sealing layer covers the light-emitting diode lamp plate, and the plurality of first light shading parts are arranged on a side of the sealing layer away from the light-emitting diode lamp plate.

Alternatively, in some embodiments of the present application, the dimming layer comprises:
- a sealing layer, wherein the sealing layer covers the light-emitting diode lamp plate, and the plurality of first light shading parts and the plurality of second shading parts are arranged on a side of the sealing layer away from the light-emitting diode lamp plate.

Alternatively, in some embodiments of the present application, the side of the sealing layer away from the light-emitting diode lamp plate is provided with the plurality of first light shielding parts protruding in a light output direction of the light-emitting diode lamp plate.

Alternatively, in some embodiments of the present application, the side of the sealing layer away from the light-emitting diode lamp plate is disposed with the plurality of second light shielding parts protruding in a light output direction of the light-emitting diode lamp plate.

Alternatively, in some embodiments of the present application, each of the first light shading parts comprise:
- a first groove, wherein the side of the sealing layer away from the light-emitting diode lamp plate is defined with the first groove, and the first groove is filled with a light shielding material.

Alternatively, in some embodiments of the present application, each of the second shading parts comprise:
- a second groove, wherein the side of the sealing layer away from the light-emitting diode lamp plate is defined with the second groove, and the second groove is filled with a light shielding material.

Alternatively, in some embodiments of the present application, the dimming layer comprises:
- a sealing layer, wherein the sealing layer covers the light-emitting diode lamp plate; and
- a transparent protective layer, wherein the transparent protective layer is arranged on a side of the sealing layer away from the light-emitting diode lamp plate, and the plurality of first light shading parts are arranged on the transparent protective layer.

Alternatively, in some embodiments of the present application, the dimming layer comprises:
- a sealing layer, wherein the sealing layer covers the light-emitting diode lamp plate; and
- a transparent protective layer, wherein the transparent protective layer is arranged on a side of the sealing layer away from the light-emitting diode lamp plate, and the plurality of first light shading parts and the plurality of second shading parts are arranged on the transparent protective layer.

Alternatively, in some embodiments of the present application, a side of the transparent protective layer away from the light-emitting diode lamp plate is disposed with the plurality of first light shielding parts protruding in a light output direction of the light-emitting diode lamp plate.

Alternatively, in some embodiments of the present application, a side of the transparent protective layer away from the light-emitting diode lamp plate is disposed with the plurality of first light shielding parts protruding in a light output direction of the light-emitting diode lamp plate.

Alternatively, in some embodiments of the present application, a side of the transparent protective layer away from the light-emitting diode lamp plate is disposed with the plurality of second light shielding parts protruding in a light output direction of the light-emitting diode lamp plate.

Alternatively, in some embodiments of the present application, each of the first light shading parts comprise:
a first groove, wherein a side of the transparent protective layer close to or away from the light-emitting diode lamp plate is defined with the first groove, and the first groove is filled with a light shielding material.

Alternatively, in some embodiments of the present application, each of the first light shading parts comprise:
a first groove, wherein a side of the transparent protective layer close to or away from the light-emitting diode lamp plate is defined with the first groove, and the first groove is filled with a light shielding material.

Alternatively, in some embodiments of the present application, each of the second shading parts comprise:
a second groove, wherein a side of the transparent protective layer close to or away from the light-emitting diode lamp plate is defined with the second groove, and the second groove is filled with a light shielding material.

Alternatively, in some embodiments of the present application, shapes of each of the first light shielding parts and each of the second light shielding parts are square-shaped; an column spacing of adjacent two of the first light shielding parts ranges from 74 microns to 140 microns, and a row spacing of adjacent two of the first light shielding parts ranges from 30 microns to 50 microns; a row spacing of adjacent two of the second light shielding parts ranges from 74 microns to 140 microns, and an column spacing of adjacent two of the second light shielding parts ranges from 30 microns to 50 microns; lengths of each of the first light shielding parts and each of the second light shielding parts range from 54 microns to 90 microns, widths of each of the first light shielding parts and each of the second light shielding parts range from 10 microns to 20 microns, and heights of each of the first light shielding parts and each of the second light shielding parts range from 100 microns to 167 microns.

The present application provides a splicing panel, comprising: at least two display panels, wherein the at least two display panels are spliced, and a gap is defined between two adjacent ones of the display panels; a light-emitting diode lamp plate, wherein the light-emitting diode lamp plate is arranged between two adjacent ones of the display panels and blocks the gap; a dimming layer, wherein the dimming layer is arranged on the light-emitting diode lamp plate, the dimming layer is provided with a plurality of first light shielding parts, the plurality of the first light shielding parts are arranged in an array, and a length direction of each of the first light shielding parts is arranged along a first direction. In the present application, the dimming layer is provided on the light-emitting diode lamp plate, and then the dimming layer is provided with the plurality of the first light shading parts arranged in an array. A visual effect of the light-emitting diode lamp plate on both sides in the first direction can be adjusted through the plurality of the first light shading parts, so as to improve the visual difference between the display panels of the splicing panel and the light-emitting diode lamp plate on both sides in the first direction.

BRIEF DESCRIPTION OF DRAWINGS

In order to explain the technical solutions in the embodiments of the present application more clearly, the following will briefly introduce the drawings needed in the description of the embodiments. Obviously, the drawings in the following description are only some embodiments of the present application. For those skilled in the art, other drawings can be obtained based on these drawings without creative work.

DETAILED DESCRIPTION OF PREFERRED EMBODIMENTS

In the following, the technical scheme in the embodiments of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application.

In the description of the present application, it should be understood that the orientation or positional relationship indicated by the terms "center", "length", "width", "up", "down", "front", "back", "left", "right", "inside", "outside" is based on an orientation or a positional relationship shown in the attached drawings, only for the convenience of describing the present application and simplifying the description, rather than indicating or implying that the device or element referred to must have a specific orientation constructed and operated in a specific orientation, therefore, it cannot be understood as a restriction on the present application. In addition, the terms "first" and "second" are only used for descriptive purposes and cannot be understood as indicating or implying relative importance or implicitly indicating the number of indicated technical features. Thus, the features defining "first" and "second" can explicitly or implicitly comprise one or more of the features.

In the description of the present application, "multiple" means two or more, unless otherwise expressly and specifically defined.

The present application provides a splicing panel 100 described in detail below. It should be noted that the order of description of the following embodiments does not limit the preferred order of the embodiments of the present application.

Figure 1:
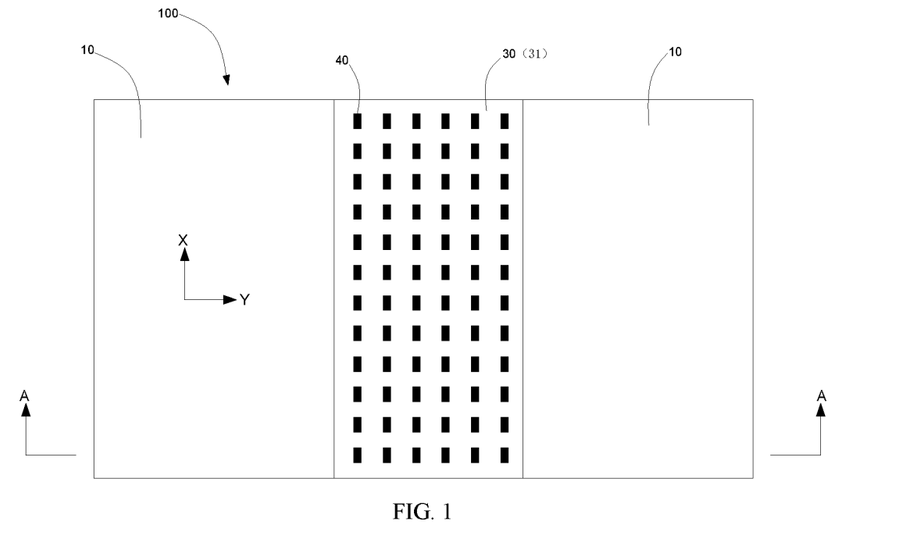
FIG. 1 is a schematic diagram of a first structure of a splicing panel provided by the present application.
Figure 2:
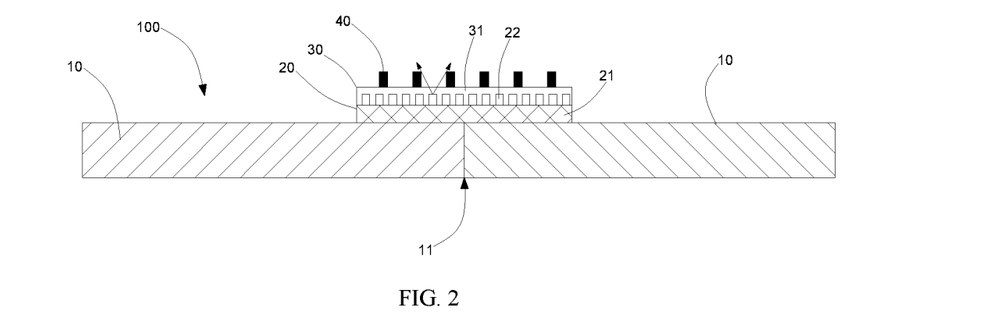
FIG. 2 is a sectional view along A-A in FIG. 1.

Please refer to FIG. 1. FIG. 1 is a schematic diagram of a first structure of a splicing panel 100 provided by the present application, and FIG. 2 is a sectional view at A-A in FIG. 1. The present application provides a splicing panel 100. The splicing panel 100 comprises at least two display panels 10, a light-emitting diode lamp plate 20, and a dimming layer 30.

Wherein the at least two display panels 10 are spliced, and a gap 11 is defined between two adjacent display panels 10. The light-emitting diode lamp plate 20 is arranged between two adjacent display panels 10 and blocks the gap 11. The dimming layer 30 is arranged on the light-emitting diode lamp plate 20. A plurality of first light shielding parts 40 are arranged on the dimming layer 30, the plurality of first light shielding parts 40 are arranged in an array, and a length direction of each of the first light shielding parts 40 is arranged along a first direction X.

In order to solve a visual problem of splicing seams, the LCD splicing panel 100 is usually provided with a light-emitting diode lamp plate 20 at splicing seams of the LCD splicing panel 100. Although the light-emitting diode lamp plate 20 can alleviate the visual problem of splicing seams of the LCD splicing panel 100, there is still a visual difference between the light-emitting diode lamp plate 20 and the liquid crystal display panel 10. In the present application, the dimming layer 30 is arranged on the light-emitting diode lamp plate 20, and the dimming layer 30 is located in a light output direction of the light-emitting diode lamp plate 20. Then, the dimming layer 30 is provided with a plurality of first light shielding parts 40 arranged in an array, and a length direction of each of the first light shielding parts 40 is arranged along the first direction X because the first light shielding parts 40 have a definite height in the light output direction of the light-emitting diode lamp plate 20. In addition, spacings of the first light shielding parts 40 in a column direction and a row direction of the array can also be adjusted according to actual needs, so as to adjust a density of the first light shielding parts 40. Since a brightness angle of the light-emitting diode lamp plate 20 on a side is large, light output from both sides of the light-emitting diode lamp plate 20 in the first direction X can be reduced by adding the first light shielding parts 40, and the height of the first light shielding parts 40 in the light output direction of the light-emitting diode lamp plate 20 and a distribution density of the first light shielding parts 40 can be adjusted simultaneously to make viewing angles on sides of the light-emitting diode lamp plate 20 and the display panel 10 consistent. Thus, the visual difference on the both sides of the display panel 10 of the splicing panel 100 and the light-emitting diode lamp plate 20 in the first direction X is improved.

In some embodiments, the light-emitting diode lamp plate 20 is a sub-millimeter light-emitting diode lamp plate 20 or a micro-light-emitting diode lamp plate 20.

When the display panel 10 is the LCD display panel 10, due to a small pixel spacing of the LCD display panel 10, the light-emitting diode lamp plate 20 is preferentially the sub-millimeter light-emitting diode lamp plate or the micro-light-emitting diode lamp plate, which can match the pixel spacing of the LCD display panel 10.

Specifically, the light-emitting diode lamp plate 20 comprises:
a substrate 21, wherein the substrate 21 is arranged on two adjacent display panels 10 and blocks the gap 11;
a light-emitting diode chip 22, wherein the light-emitting diode chip 22 is arranged on a side of the substrate 21.

The light-emitting diode chip 22 is a sub-millimeter light-emitting diode chip or a micro-light-emitting diode chip. The first light shielding parts 40 and the light-emitting diode chip 22 can be staggered, or not be staggered. That is, an orthographic projection of the first light shielding parts 40 on the substrate 21 and an orthographic projection of the light-emitting diode chip 22 on the substrate 21 can overlap, or not overlap. A specific arrangement of the first light shielding parts 40 can be arranged according to an actual situation.

In some embodiments, the dimming layer 30 comprises:
a sealing layer 31, wherein the sealing layer 31 covers the light-emitting diode lamp plate 20, and the plurality of first light shading parts 40 are arranged on a side of the sealing layer 31 away from the light-emitting diode lamp plate 20. Specifically, the sealing layer 31 covers a side of the substrate 21 provided with the light-emitting diode chip 22.

The sealing layer 31 can package and fix the light-emitting diode chip 22 on the substrate 21, and the sealing layer 31 is also provided with the first light shielding parts 40, which can reduce structural setting and reduce cost.

Further, the side of the sealing layer 31 away from the light-emitting diode lamp plate 20 is provided with the plurality of first light shielding parts 40 projecting in a light output direction of the light-emitting diode lamp plate 20. The plurality of first light shielding parts 40 are arranged in an array, and a length direction of each of the first light shielding parts 40 is arranged along the first direction X.

The first light shielding parts 40 are made of light shielding material, preferably black light shielding material. A shape of the first light shielding part 40 can be a square shape. In one embodiment, a length of the substrate 21 is 250 mm, a width of the substrate 21 is 70 mm; a row spacing between adjacent two of the first light shielding parts 40 is 64 microns, a column spacing between adjacent two of the first light shielding parts 40 is 70 microns; and a length of the square shape is 126 microns, a width of the square shape is 20 microns, and a height of the square shape is 100 microns.

Figure 3:
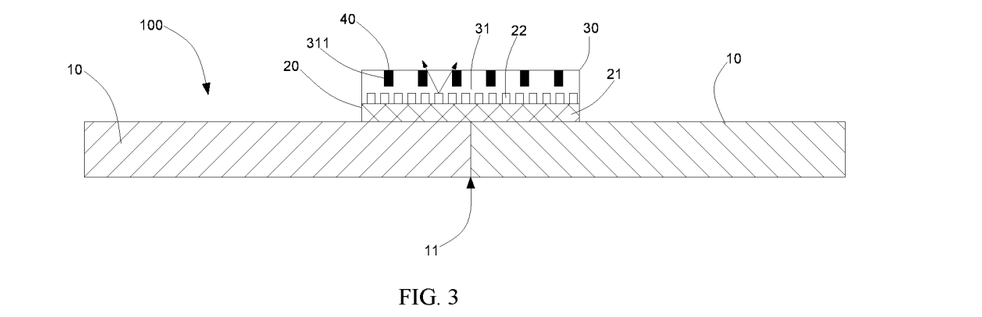
FIG. 3 is a schematic diagram of a second structure of the splicing panel provided by the present application.

Please refer to FIG. 3, FIG. 3 is a second schematic structural diagram of the splicing panel 100 provided by the present application. A difference between the present embodiment and the splicing panel 100 provided in FIG. 2 is that each of the first light shading part 40 comprise:
a first groove 311, wherein the first groove 311 is arranged on a side of the sealing layer 31 away from the light-emitting diode lamp plate 20, and the first groove 311 is filled with light shielding material.

That is, in the above embodiment, each of the first light shielding parts 40 is formed by setting the first groove 311 on the side of the sealing layer 31 away from the light-emitting diode lamp plate 20 and filling the first groove 311 with light shielding material, and the first light shielding parts 40 are located in the sealing layer 31, which can prevent the first light shielding parts 40 from being damaged by external force.

Figure 4:
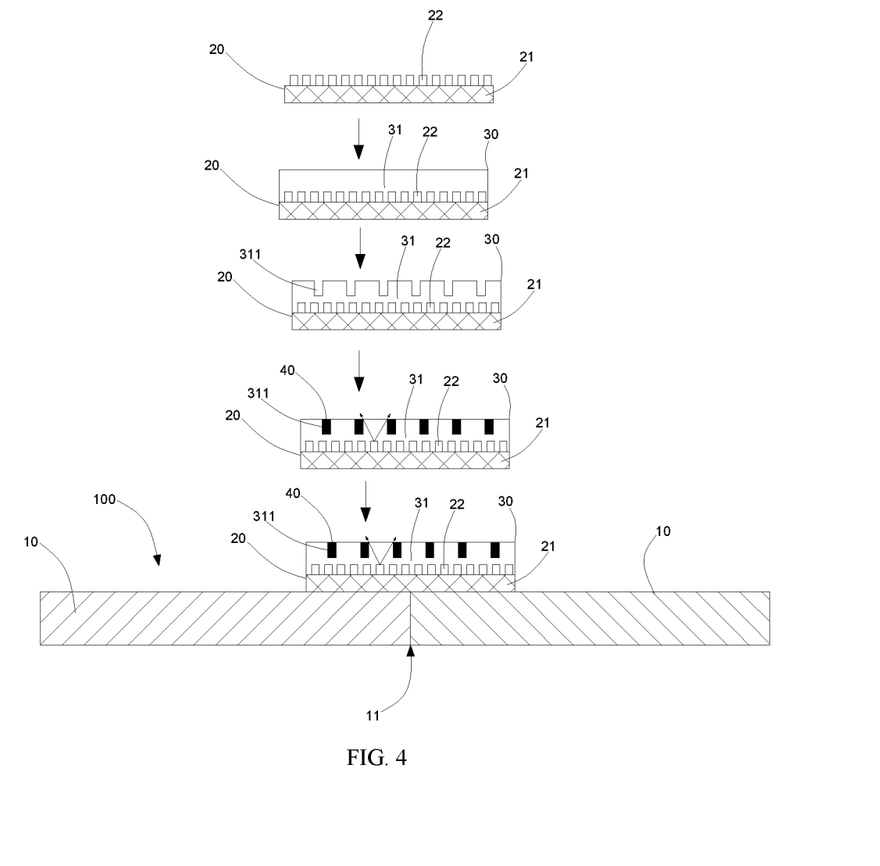
FIG. 4 is a schematic diagram of a manufacturing process of the second structure of the splicing panel provided by the present application.

Please refer to FIG. 4, FIG. 4 is a schematic diagram of a manufacturing process of the second structure of the splicing panel 100 provided by the present application. First, a light-emitting diode lamp plate 20 is formed; wherein the light-emitting diode lamp plate 20 comprises a substrate 21 and a light-emitting diode chip 22, the substrate 21 is arranged on two adjacent display panels 10 and blocks the gap 11, and the light-emitting diode chip 22 is arranged on one side of the substrate 21. Next, a sealing layer 31 is formed on a basis of the light emitting diode lamp plate 20, then a first groove 311 is opened on a side of the sealing layer 31 away from the light emitting diode lamp plate 20, and then the first groove 311 is filled with light shielding material to form the first light shielding part 40. Finally, the light-emitting diode lamp plate 20, the sealing layer 31, and the first light shielding parts 40 are installed between the adjacent display panels 10.

Figure 5:
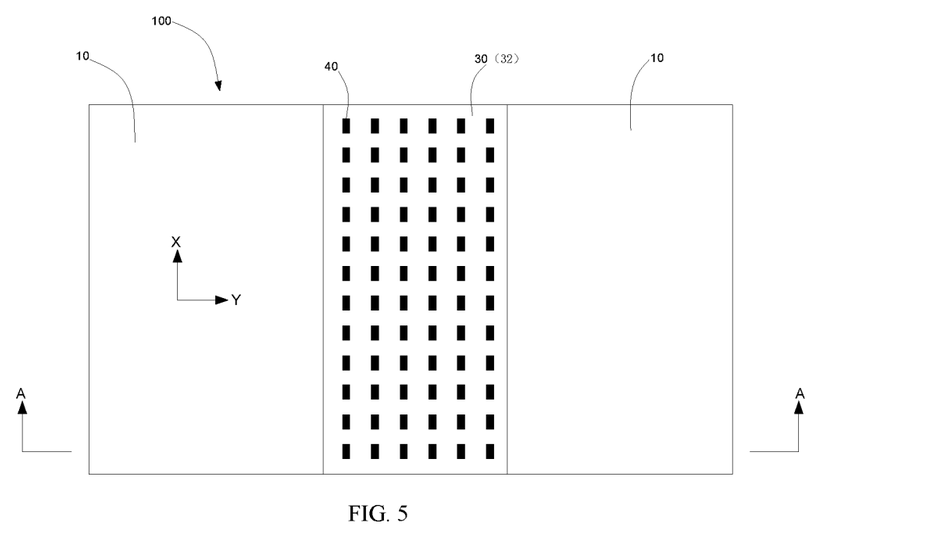
FIG. 5 is a schematic diagram of a third structure of the splicing panel provided by the present application.
Figure 6:
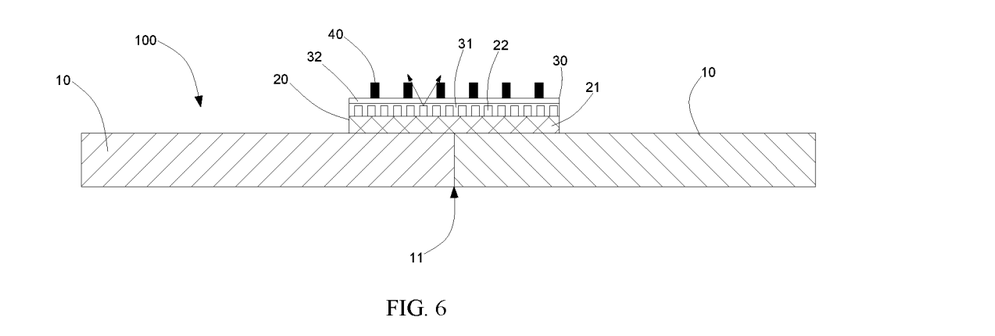
FIG. 6 is a sectional view along A-A in FIG. 5.

Please refer to FIG. 5, FIG. 5 is a schematic diagram of a third structure of the splicing panel 100 provided by the present application, and FIG. 6 is a sectional view at A-A in FIG. 5. A difference between the present embodiment and the splicing panel 100 provided in FIG. 2 is that the dimming layer 30 comprises:

a sealing layer 31, wherein the sealing layer 31 covers the light-emitting diode lamp plate 20;

a transparent protective layer 32, wherein the transparent protective layer 32 is arranged on a side of the sealing layer 31 away from the light-emitting diode lamp plate 20, and the plurality of first light shading parts 40 are arranged on the transparent protective layer 32.

That is, in the present embodiment, arranging the first light shielding parts 40 on the transparent protective layer 32 can increase a spacing between the first light shielding parts 40 and the light-emitting diode lamp plate 20. Under a condition of obtaining a same viewing angle, the embodiment of arranging the first light shielding parts 40 on the transparent protective layer 32 can make a height of the first light shielding parts 40 lower than the embodiment of arranging the first light shielding parts 40 on the sealing layer 31. The height of the first light shading parts 40 has more choices, so the present embodiment can have more choices of viewing angle effects.

In addition, the transparent protective layer 32 is transparent glass or polyester resin layer.

In some embodiments, a side of the transparent protective layer 32 away from the light-emitting diode lamp plate 20 is provided with the plurality of first light shielding parts 40 projecting in the light output direction of the light-emitting diode lamp plate 20. A structure of projecting the first light shielding parts 40 on the side of the transparent protective layer 32 away from the light-emitting diode lamp plate 20 can simplify a manufacturing process and improve production efficiency.

Figure 7:
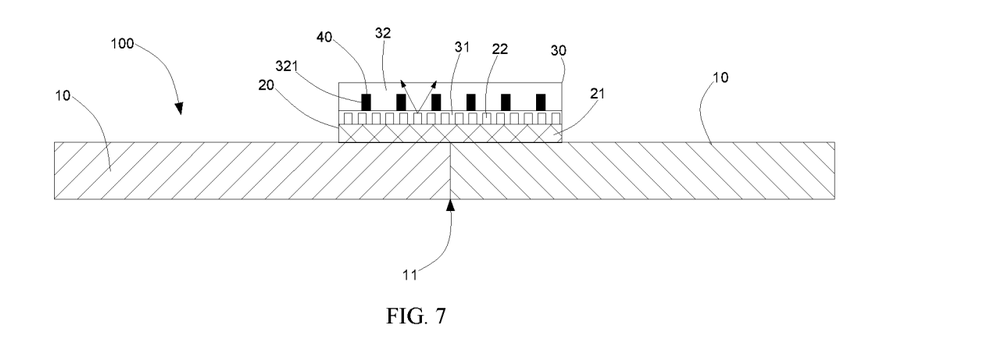
FIG. 7 is a schematic diagram of a fourth structure of the splicing panel provided by the present application.

Please refer to FIG. 7, FIG. 7 is a schematic structural diagram of the splicing panel 100 provided by the present application. A difference between the present embodiment and the splicing panel 100 provided in FIG. 6 is that each of the first light shading part 40 comprise:

a first groove 321, wherein the first groove 321 is arranged on a side of the transparent protective layer 32 close to or away from the light-emitting diode lamp plate 20, and the first groove 321 is filled with light shielding material.

That is, in the above embodiment, each of the first light shielding parts 40 are formed by arranging the first groove 321 on the side of the transparent protective layer 32 close to or away from the light-emitting diode lamp plate 20 and filling the first groove 321 with light shielding material, and the first light shielding parts 40 are located in the transparent protective layer 32, which can prevent the first light shielding parts 40 from being damaged by external force. Specifically, in the present embodiment, the first groove 321 is arranged on the side of the transparent protective layer 32 close to the light-emitting diode lamp plate 20. The first groove 321 can be arranged at a position of the transparent protective layer 32 according to actual needs of a distance between the first light shading parts 40 and the light-emitting diode lamp plate 20.

Figure 8:
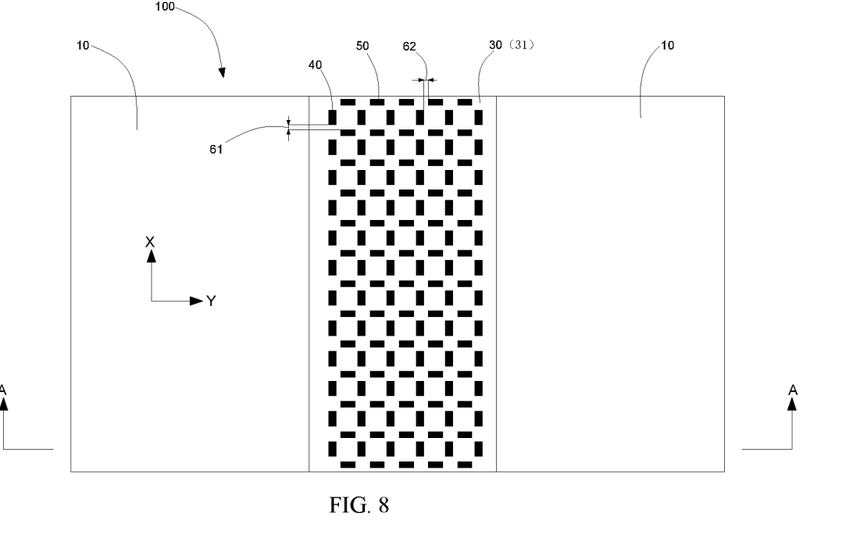
FIG. 8 is a schematic diagram of a fifth structure of the splicing panel provided by the present application.
Figure 9:
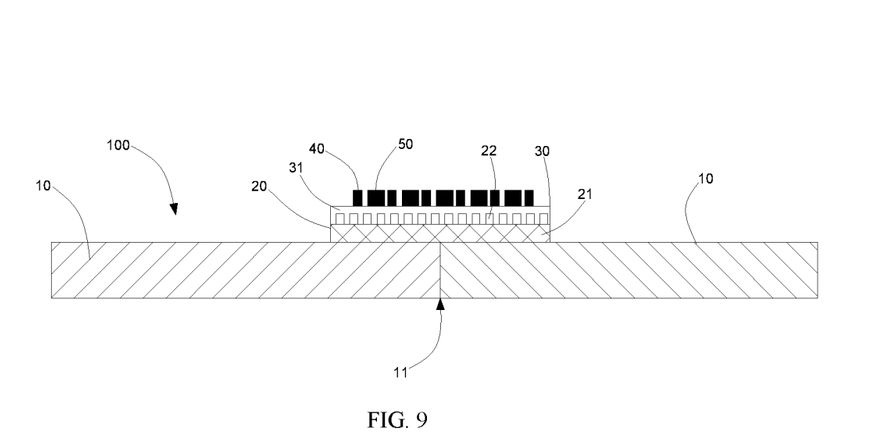
FIG. 9 is a sectional view along A-A in FIG. 8.

Please refer to FIG. 8. FIG. 8 is a schematic diagram of a fifth structure of the splicing panel 100 provided by the present application, and FIG. 9 is a sectional view at A-A in FIG. 8. A difference between the present embodiment and the splicing panel 100 provided in FIG. 1 is that a plurality of second light shielding parts 50 are arranged on the dimming layer 30, the plurality of second light shielding parts 50 are arranged in an array, and a length direction of each of the second light shielding parts 50 is arranged along a second direction Y.

In the present application, the plurality of second light shielding parts 50 arranged in an array are arranged on the dimming layer 30, and the length direction of the second light shielding parts 50 is arranged along the second direction Y because the second light shielding parts 50 have a certain height in the light output direction of the light-emitting diode lamp plate 20. In addition, spacings of the second light shielding parts 50 in a column direction and a row direction of the array can also be adjusted according to actual needs, so as to adjust a density of the second light shielding parts 50. Since a brightness angle of the light-emitting diode lamp plate 20 on a side is large, the light output of the light-emitting diode lamp plate 20 on both sides of the second direction Y can be reduced by adding the second light shielding parts 50, and the height of the second light shielding parts 50 in the light output direction of the light-emitting diode lamp plate 20 and the distribution density of the second light shielding parts 50 can be adjusted to make a lateral angles of view of the light-emitting diode lamp plate 20 and the display panel 10 consistent, Thus, the visual difference between the display panel 10 of the splicing panel 100 and the light-emitting diode lamp plate 20 on both sides of the first direction X is improved.

That is, the visual difference between the display panel 10 and the light-emitting diode lamp plate 20 in the first direction X is improved, and then the visual difference between the display panel 10 and the light-emitting diode lamp plate 20 in the second direction Y is improved, so as to improve the visual difference between the display panel 10 and the light-emitting diode lamp plate 20 in four sides and further improve a visual effect of the splicing panel 100.

In some embodiments, the first direction X is perpendicular to the second direction Y. Of course, the first direction X can also be parallel to a first side of a parallelogram, while the second direction Y is parallel to a second side of the parallelogram, and the first side is adjacent to the second side.

Further, a first gap 61 is defined between an orthographic projection of the first light shielding part 40 in the first direction X and an orthographic projection of the second light shielding parts 50 adjacent to the first light shielding part 40 in the first direction X. Since the first light shielding parts 40 are arranged in the first direction X and the second light shielding parts 50 are arranged in the second direction Y, if a closed structure is formed at close ends between the first light shielding parts 40 and the second light shielding parts 50 adjacent to the first light shielding parts 40, there will be black spots on a certain side. Therefore, the first gap 61 is defined between the orthographic projection of the first light shielding part 40 in the first direction X and the orthographic projection of the second light shielding part 50 adjacent to the first light shielding part 40 in the first direction X, which can prevent generation of visual black spots.

Further, a second gap 62 is defined between an orthographic projection of the first light shielding part 40 in the second direction Y and an orthographic projection of the second light shielding parts 50 adjacent to the first light shielding part 40 in the second direction Y. Since the first light shielding part 40 is arranged in the first direction X and the second light shielding part 50 is arranged in the second direction Y, if a closed structure is formed at adjacent ends between the first light shielding part 40 and the second light shielding part 50 adjacent to the first light shielding part 40, there will be black spots on a certain side, Therefore, a second gap 62 is defined between the orthographic projection of the first light shielding part 40 in the second direction Y and the orthographic projection of the second light shielding part 50 adjacent to the first light shielding part 40 in the second direction Y, which can avoid the generation of visual black spots.

The second light shielding parts 50 and the light-emitting diode chip 22 can be staggered or be not staggered, that is, the orthographic projection of the second light shielding parts 50 on the substrate 21 and an orthographic projection of the light-emitting diode chip 22 on the substrate 21 can overlap or not overlap, and a specific setting mode of the second light shielding parts 50 can be set according to actual needs.

In some embodiments, the dimming layer 30 comprises:
a sealing layer 31, wherein the sealing layer 31 covers the light-emitting diode lamp plate 20, and a side of the sealing layer 31 away from the light-emitting diode lamp plate 20 is provided with the plurality of first light shielding parts 40 and the plurality of second light shielding parts 50. Specifically, the sealing layer 31 covers a side of the substrate 21 provided with the light-emitting diode chip 22.

The sealing layer 31 can package and fix the light-emitting diode chip 22 on the substrate 21, and the sealing layer 31 is also provided with the first light shielding parts 40 and the second light shielding parts 50, which can reduce structural setting and reduce cost.

Further, the side of the sealing layer 31 away from the light-emitting diode lamp plate 20 is provided with the plurality of first light shielding parts 40 projecting in the light output direction of the light-emitting diode lamp plate 20. The plurality of first light shielding parts 40 are arranged in an array, and the length direction of the first light shielding parts 40 is arranged along the first direction X. A structure of projecting the first light shading parts 40 on the side of the sealing layer 31 away from the light-emitting diode lamp plate 20 can simplify the manufacturing process and improve the production efficiency.

Further, the side of the sealing layer 31 away from the light-emitting diode lamp plate 20 is provided with the plurality of second light shielding parts 50 projecting in the light output direction of the light-emitting diode lamp plate 20. The plurality of second light shielding parts 50 are arranged in an array, and the length direction of the second light shielding parts 50 is arranged along the second direction Y. A structure of projecting the second light shielding parts 50 on the side of the sealing layer 31 away from the light-emitting diode lamp plate 20 can simplify the manufacturing process and improve the production efficiency.

The first light shielding parts 40 and the second light shielding parts 50 are made of light shielding material, preferably black light shielding material. Shapes of the first light shielding parts 40 and the second light shielding parts 50 can both be a square shape. An column spacing of adjacent two of the first light shielding parts 40 ranges from 74 microns to 140 microns; a row spacing of adjacent two of the first light shielding parts 40 ranges from 30 microns to 50 microns; a row spacing of adjacent two of the second light shielding parts 50 ranges from 74 microns to 140 microns; and an column spacing of adjacent two of the second light shielding parts 50 ranges from 30 microns to 50 microns. Lengths of the first light shielding part 40 and the second light shielding part 50 range from 54 microns to 90 microns; widths of the first light shielding part 40 and the second light shielding part 50 range from 10 microns to 20 microns; heights of the first light shielding part 40 and the second light shielding part 50 range from 100 microns to 167 microns. According to experimental research of the present application, array structures of the first light shading parts 40 and the second shading parts 50 adopt the above specification mode, which has good visual effects and will not produce visual black spots or black bars.

In one embodiment, the row spacing of adjacent two of the first light shielding parts 40 is 30 microns; the column spacing of adjacent two of the first light shielding parts 40 is 74 microns; the row spacing of adjacent two of the second light shielding parts 50 is 74 microns; and the column spacing of adjacent two of the second light shielding parts 50 is 30 microns. The length of the first light shielding part 40 and the length of the second light shielding part 50 are both 54 microns; the width of the first light shielding part 40 and the width of the second light shielding part 50 are both 10 microns; the height of the first light shielding part 40 and the height of the second light shielding part 50 are both 100 microns. In another embodiment, the row spacing of adjacent two of the first light shielding parts 40 is 50 microns; the column spacing of adjacent two of the first light shielding parts 40 is 140 microns; the row spacing of adjacent two of the second light shielding parts 50 is 140 microns, and the column spacing of adjacent two of the second light shielding parts 50 is 30 microns. The length of the first light shielding part 40 and the length of the second light shielding part 50 are both 90 microns; the width of the first light shielding part 40 and the width of the second light shielding part 50 are both 10 microns; the height of the first light shielding part 40 and the height of the second light shielding part 50 are both 167 microns.

Figure 10:
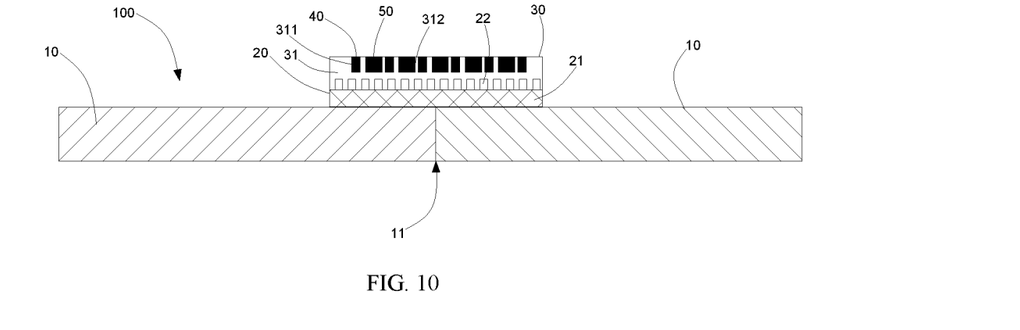
FIG. 10 is a schematic diagram of a sixth structure of the splicing panel provided by the present application.

Please refer to FIG. 10. FIG. 10 is a schematic diagram of a sixth structure of the splicing panel 100 provided by the present application. A difference between the present embodiment and the splicing panel 100 provided in FIG. 9 is that each of the first light shading part 40 comprise:
a first groove 311, wherein the first groove 311 is arranged on a side of the sealing layer 31 away from the light-emitting diode lamp plate 20, and the first groove 311 is filled with light shielding material.

That is, in the above embodiment, each of the first light shielding parts 40 are formed by arranging the first groove 311 on the side of the sealing layer 31 away from the light-emitting diode lamp plate 20 and filling the first groove 311 with light shielding material, and the first light shielding parts 40 are located in the sealing layer 31, which can prevent the first light shielding parts 40 from being damaged by external force. Wherein, the light shielding material is a black light shielding material.

Each of the second light shielding part 50 comprise:
a second groove 312, wherein the side of the sealing layer 31 away from the light-emitting diode lamp plate 20 is provided with the second groove 312, and the second groove 312 is filled with light shielding material.

That is, in the above embodiment, each of the second light shielding parts 50 are formed by arranging the second groove 312 on the side of the sealing layer 31 away from the light-emitting diode lamp plate 20 and filling the light shielding material in the second groove 312, and the second light shielding parts 50 are located in the sealing layer 31, which can prevent the second light shielding parts 50 from being damaged by external force. Wherein, the light shielding material is a black light shielding material.

In addition, it should be noted that in other embodiments of the present application, the first light shading parts 40 can be protruded on the side of the sealing layer 31 away from the light-emitting diode lamp plate 20, and the second shading parts 50 can be arranged in the sealing layer 31. In other embodiments of the present application, the first light shielding parts 40 can be arranged in the sealing layer 31, and the second light shielding parts 50 are protruded on the side of the sealing layer 31 away from the light-emitting diode lamp plate 20.

Figure 11:
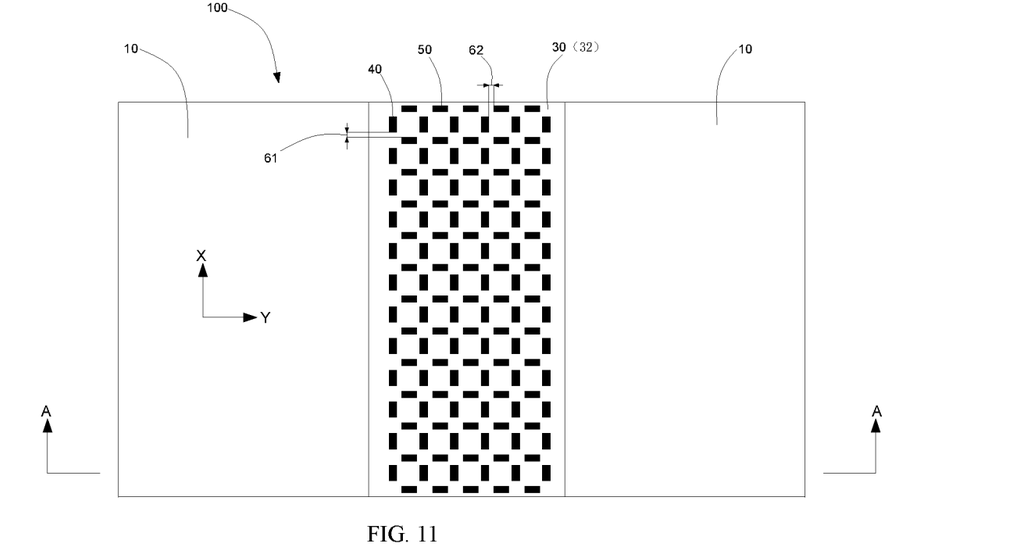
FIG. 11 is a schematic diagram of a seventh structure of the splicing panel provided by the present application.
Figure 12:
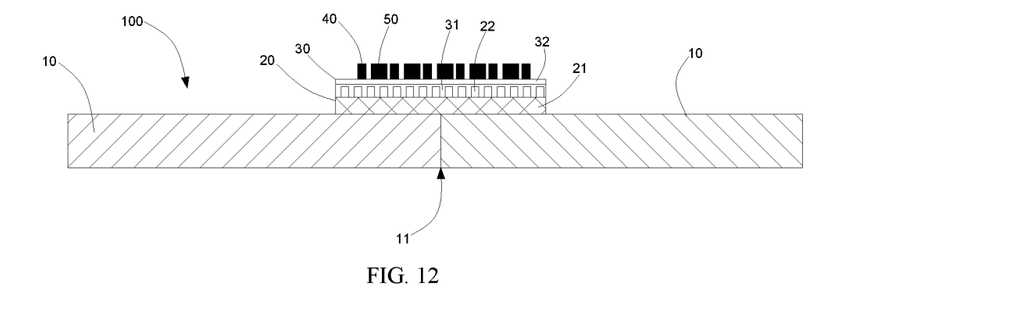
FIG. 12 is a sectional view along A-A in FIG. 11.

Please refer to FIG. 11. FIG. 11 is a schematic diagram of a seventh structure of the splicing panel 100 provided by the present application, and FIG. 12 is a sectional view at A-A in FIG. 11. A difference between the embodiment and the splicing panel 100 provided in FIG. 9 is that the dimming layer 30 comprises:
a sealing layer 31, wherein the sealing layer 31 covers the light-emitting diode lamp plate 20;
a transparent protective layer 32, wherein the transparent protective layer 32 is arranged on a side of the sealing layer 31 away from the light-emitting diode lamp plate 20, and the plurality of first light shielding parts 40 and the plurality of second light shielding parts 50 are arranged on the transparent protective layer 32.

That is, in the present embodiment, by arranging the first light shielding parts 40 and the second light shielding parts 50 on the transparent protective layer 32, a spacing between the first light shielding parts 40 and the light-emitting diode lamp plate 20 and a spacing between the second light shielding parts 50 and the light-emitting diode lamp plate 20 can be increased. Under the condition of obtaining a same viewing angle, compared with the embodiment in which the first light shielding parts 40 and the second light shielding parts 50 are arranged on the sealing layer 31, the embodiment of arranging the first light shielding parts 40 and the second light shielding parts 50 on the transparent protective layer 32 can make a height of the first light shielding parts 40 and the second light shielding parts 50 lower, and there are more choices for the height of the first light shielding parts 40 and the second light shielding parts 50. Therefore, the present embodiment can have more choices of viewing angle effects.

In addition, the transparent protective layer 32 is transparent glass or polyester resin layer.

In some embodiments, a side of the transparent protective layer 32 away from the light-emitting diode lamp plate 20 is provided with the plurality of first light shielding parts 40 and the plurality of second light shielding parts 50 projecting in a light output direction of the light-emitting diode lamp plate 20. A structure of projecting the first light shielding parts 40 and the second light shielding parts 50 on the side of the transparent protective layer 32 away from the light-emitting diode lamp plate 20 can simplify the manufacturing process and improve the production efficiency.

Figure 13:
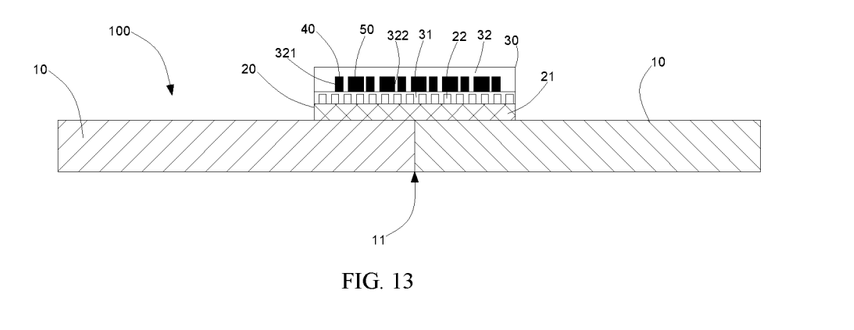
FIG. 13 is an schematic diagram of a eighth structure of the splicing panel provided by the present application.

Please refer to FIG. 13. FIG. 13 is an schematic diagram of a eighth structure of the splicing panel 100 provided by the present application. A difference between the present embodiment and the splicing panel 100 provided in FIG. 12 is that each of the first light shading part 40 comprise:
a first groove 321, wherein the first groove 321 is arranged on a side of the transparent protective layer 32 close to or away from the light-emitting diode lamp plate 20, and the first groove 321 is filled with light shielding material.

That is, in the above embodiment, each of the first light shielding parts 40 are formed by arranging the first groove 321 on the side of the transparent protective layer 32 close to or away from the light-emitting diode lamp plate 20 and filling the first groove 321 with light shielding material, and the first light shielding parts 40 are located in the transparent protective layer 32, which can prevent the first light shielding parts 40 from being damaged by external force. Specifically, in the present embodiment, the first groove 321 is arranged on the side of the transparent protective layer 32 close to the light-emitting diode lamp plate 20. Wherein, the light shielding material is a black light shielding material.

Each of the second light shielding part 50 comprise:
a second groove 322, wherein the second groove 322 is arranged on the side of the transparent protective layer 32 close to or away from the light-emitting diode lamp plate 20, and the second groove 322 is filled with light shielding material.

That is, in the above embodiment, each of the second light shielding parts 50 are formed by arranging the second groove 322 on the side of the transparent protective layer 32 close to or away from the light-emitting diode lamp plate 20 and filling the light shielding material in the second groove 322, and the second light shielding parts 50 are located in the transparent protective layer 32, which can prevent the second light shielding parts 50 from being damaged by external force. Specifically, in the present embodiment, the side of the transparent protective layer 32 close to the light-emitting diode lamp plate 20 is provided with the second groove 322. Wherein, the light shielding material is a black light shielding material.

In addition, it should be noted that in other embodiments of the present application, the first light shielding parts 40 can be protruded on the side of the transparent protective layer 32 away from the light-emitting diode lamp plate 20, and the second light shielding parts 50 can be arranged in the transparent protective layer 32. In other embodiments of the present application, the first light shielding parts 40 can be arranged in the transparent protective layer 32, and the second light shielding parts 50 are protruded on the side of the transparent protective layer 32 away from the light-emitting diode lamp plate 20.

The splicing panel provided in the present application is described in detail above. And in this paper, specific examples are applied to explain the principle and implementation mode of the application. The above embodiments are only examples of the implementation of the present invention. It must be noted that the disclosed embodiments do not limit the scope of the present invention. On the contrary, the modification and equalization of the spirit and scope comprised in the claims are comprised in the scope of the invention.

What is claimed is:

1. A splicing panel, comprising:
   at least two display panels, wherein the at least two display panels are spliced, and a gap is defined between two adjacent ones of the display panels;
   a light-emitting diode lamp plate, arranged between two adjacent ones of the display panels and blocking the gap;
   a dimming layer, arranged on the light-emitting diode lamp plate;
   a plurality of first light shielding parts, arranged on the dimming layer in an array, wherein a length direction of each of the first light shielding parts is arranged along a first direction; and
   a plurality of second light shielding parts, arranged on the dimming layer in an array, wherein a length direction of each of the second light shielding parts is arranged along a second direction;
   wherein each of the first light shielding parts is spaced apart from adjacent ones of the second light shielding parts; and
   wherein shapes of each of the first light shielding parts and each of the second light shielding parts are square-shaped; an column spacing of adjacent two of the first light shielding parts ranges from 74 microns to 140 microns, and a row spacing of adjacent two of the first light shielding parts ranges from 30 microns to 50 microns; a row spacing of adjacent two of the second light shielding parts ranges from 74 microns to 140 microns, and an column spacing of adjacent two of the second light shielding parts ranges from 30 microns to 50 microns; lengths of each of the first light shielding parts and each of the second light shielding parts range from 54 microns to 90 microns, widths of each of the first light shielding parts and each of the second light shielding parts range from 10 microns to 20 microns, and heights of each of the first light shielding parts and each of the second light shielding parts range from 100 microns to 167 microns.

2. The splicing panel according to claim 1, wherein a first gap is defined between an orthographic projection of one of the first light shielding parts in the first direction and an orthographic projection of one of the second light shielding parts adjacent to the one of the first light shielding parts in the first direction.

3. The splicing panel according to claim 1, wherein a second gap is defined between an orthographic projection of one of the first light shielding parts in the second direction and an orthographic projection of one of the second light shielding parts adjacent to the one of the first light shielding parts in the second direction.

4. The splicing panel according to claim 1, wherein the light-emitting diode lamp plate is a sub-millimeter light-emitting diode lamp plate or a micro-light-emitting diode lamp plate.

5. The splicing panel according to claim 1, wherein the dimming layer comprises:
   a sealing layer, wherein the sealing layer covers the light-emitting diode lamp plate, and the plurality of first light shading parts and the plurality of second shading parts are arranged on a side of the sealing layer away from the light-emitting diode lamp plate.

6. The splicing panel according to claim 5, wherein the side of the sealing layer away from the light-emitting diode lamp plate is provided with the plurality of first light shielding parts protruding in a light output direction of the light-emitting diode lamp plate.

7. The splicing panel according to claim 5, wherein the side of the sealing layer away from the light-emitting diode lamp plate is disposed with the plurality of second light shielding parts protruding in a light output direction of the light-emitting diode lamp plate.

8. The splicing panel according to claim 5, wherein each of the first light shading parts comprise:
   a first groove, wherein the side of the sealing layer away from the light-emitting diode lamp plate is defined with the first groove, and the first groove is filled with a light shielding material.

9. The splicing panel according to claim 5, wherein each of the second shading parts comprise:
   a second groove, wherein the side of the sealing layer away from the light-emitting diode lamp plate is defined with the second groove, and the second groove is filled with a light shielding material.

10. The splicing panel according to claim 1, wherein the dimming layer comprises:
    a sealing layer, wherein the sealing layer covers the light-emitting diode lamp plate; and
    a transparent protective layer, wherein the transparent protective layer is arranged on a side of the sealing layer away from the light-emitting diode lamp plate, and the plurality of first light shading parts and the plurality of second shading parts are arranged on the transparent protective layer.

11. The splicing panel according to claim 10, wherein a side of the transparent protective layer away from the light-emitting diode lamp plate is disposed with the plurality of first light shielding parts protruding in a light output direction of the light-emitting diode lamp plate.

12. The splicing panel according to claim 10, wherein a side of the transparent protective layer away from the light-emitting diode lamp plate is disposed with the plurality of second light shielding parts protruding in a light output direction of the light-emitting diode lamp plate.

13. The splicing panel according to claim 10, wherein each of the first light shading parts comprise:
    a first groove, wherein a side of the transparent protective layer close to or away from the light-emitting diode lamp plate is defined with the first groove, and the first groove is filled with a light shielding material.

14. The splicing panel according to claim 10, wherein each of the second shading parts comprise:
    a second groove, wherein a side of the transparent protective layer close to or away from the light-emitting diode lamp plate is defined with the second groove, and the second groove is filled with a light shielding material.

* * * * *